No. 723,036. PATENTED MAR. 17, 1903.
R. SALTSMAN.
BRAKE.
APPLICATION FILED JUNE 18, 1902.
NO MODEL.
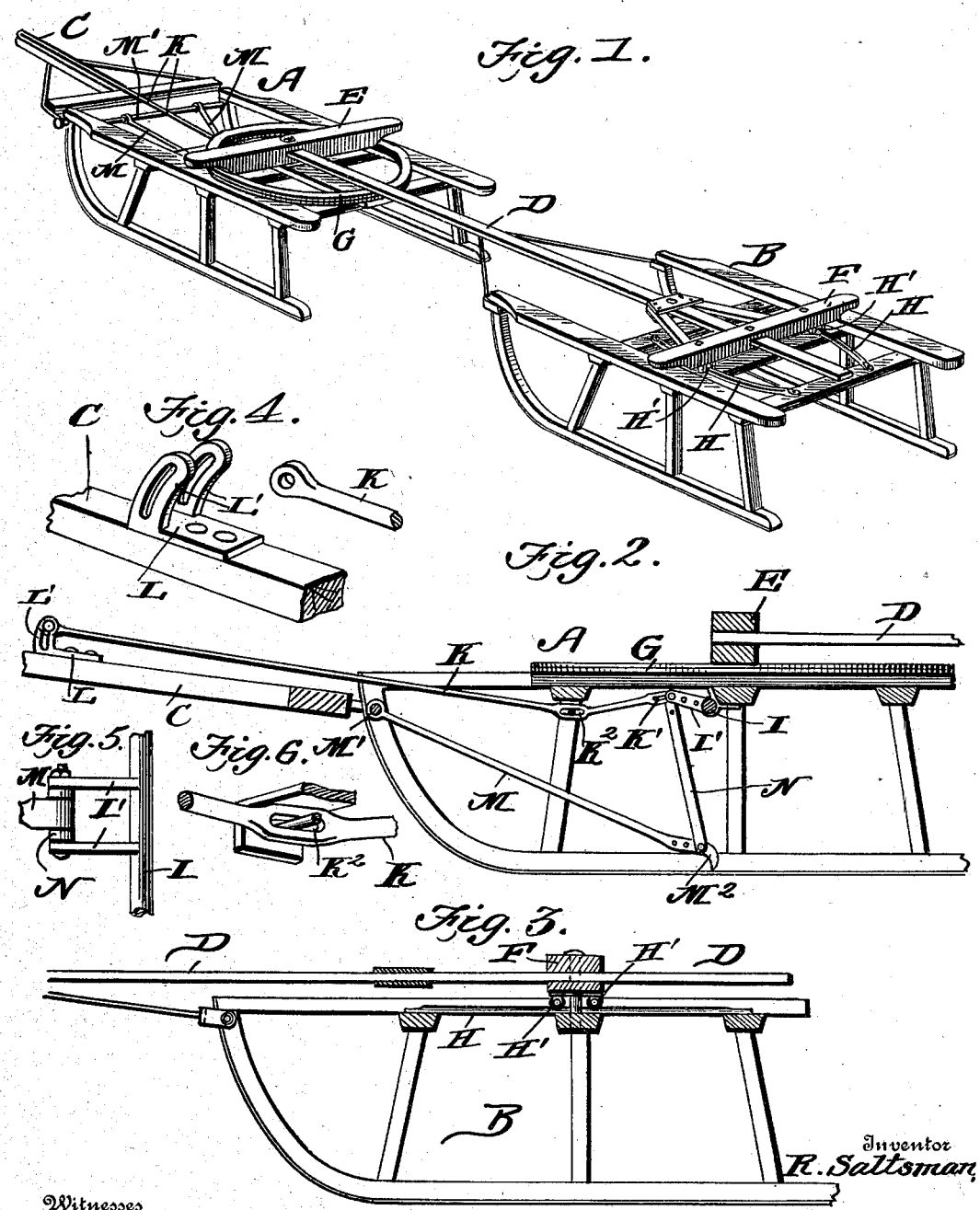

UNITED STATES PATENT OFFICE.

RALPH SALTSMAN, OF AVOCA, NEW YORK.

BRAKE.

SPECIFICATION forming part of Letters Patent No. 723,036, dated March 17, 1903.

Application filed June 18, 1902. Serial No. 112,166. (No model.)

*To all whom it may concern:*

Be it known that I, RALPH SALTSMAN, a citizen of the United States, residing at Avoca, in the county of Steuben and State of New York, have invented a new and useful Vehicle and Sleigh Brake, of which the following is a specification.

This invention relates generally to brakes, and more particularly to one adapted for use in connection with sleighs, although it will be understood that such a brake can be employed in connection with wheeled vehicles.

The object of the invention is to provide a brake which will be automatically operated the moment the draft upon the vehicle is checked, thereby preventing the vehicle crowding forward upon the draft-animals, and it is obvious that such brake is particularly adapted in connection with heavy sleighs.

The invention consists also in the novel features of construction and combination, all of which will be fully described hereinafter and pointed out in the claims.

In the drawings forming part of this specification, Figure 1 is a perspective view showing the runners of a sleigh. Fig. 2 is a sectional view taken through the front truck, the tongue and brake mechanism being shown in elevation. Fig. 3 is a sectional view taken through the rear truck or runner. Figs. 4, 5, and 6 show details of construction hereinafter referred to.

Referring to the drawings, A indicates the front truck or runners, and B the rear truck or runners. The tongue C is pivotally connected to the front runners in the usual manner, and the front and rear trucks or runners are connected by means of a pole D, which extends from the front bolster E through the rear bolster F. A fifth-wheel G, of any preferred construction, is arranged upon the front truck or runner, and the curved tracks H are arranged upon the rear trucks, and the rear bolster is provided with grooved rollers H', adapted to travel upon the said tracks, thereby permitting a limited pivotal movement of the rear truck. A rock-shaft I is mounted upon the under side of one of the cross-beams of the front truck and carries the forwardly-projecting arms I', to which is pivotally connected an operating-rod K, the forward end of said rod being pivotally connected to a bracket L, secured to the upper side of the tongue C, said bracket having two upward-projecting slotted ears L', between which the end of the rod K is pivoted, as most clearly shown in Figs. 2 and 4. The rear end of the rod is slotted, as shown at K', and intermediate its ends the said rod is slotted, as shown at K², the purpose of said slots being to permit a limited movement, so as to compensate for any irregularity in the surface over which the wheel is being drawn. A brake-bar M is pivoted at its forward end M' between the forward ends of the runners and extends rearwardly, terminating in a shoe M², which is adapted to be brought into contact with the ground for the purpose of braking the vehicle, and the rod N pivotally connects the arms I' with the end of the brake-bar M, so that when the motion of the draft-animals is checked the rearward and upward movement upon the tongue will serve to throw the rod N downwardly, forcing the brake-shoe M² into contact with the earth. When the draft is resumed upon the tongue, all the parts will be brought back to their normal positions, and when the sleigh is moving forwardly if the brake-shoe should come in contact with any obstruction the slots in the various connecting parts will permit the brake-shoe to ride freely over such obstructions without damaging the brake-operating mechanism.

A truck constructed in accordance with my invention while particularly adapted for sleighs can be used in connection with wheeled vehicles, and it will be noted that the operation of the brake is entirely automatic and dependent upon the backward movement of the draft-beam.

The arms I' and the rear end of the brake-bar N are each provided with a series of perforations to receive the pivot-bolts, so that a variety of different adjustments may be had.

Having thus fully described my invention, what I claim as new, and desire to secure by Letters Patent, is—

1. The combination with a truck and tongue, a bracket on the tongue, of a rod, slotted intermediate its ends, pivotally connected to the bracket, a brake-bar pivoted at one end to the truck, a brake member secured to the free end of the bar, a rock-shaft connected to the inner end of the rod, and a cross-bar connected at one end to the rod and at the other to the brake member, substantially as described.

2. The combination with a truck and tongue, of a bracket secured to the tongue and having slotted ears, a rod pivoted between said slotted ears, and slotted at its rear end, and also intermediate its ends, a brake-bar pivoted to the truck and terminating in a shoe, a rock-shaft having arms extending therefrom, the rear end of the rod being pivotally connected to said arms, and a depending rod pivotally connected to said arms, and also to the rear end of the brake-bar, for the purpose specified.

RALPH SALTSMAN.

Witnesses:
CHAS. M. WALKER,
MABEL WALKER.